United States Patent
Atal

(10) Patent No.: US 7,369,993 B1
(45) Date of Patent: May 6, 2008

(54) SYSTEM AND METHOD OF PATTERN RECOGNITION IN VERY HIGH-DIMENSIONAL SPACE

(75) Inventor: Bishnu Saroop Atal, New Providence, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/617,834

(22) Filed: Dec. 29, 2006

Related U.S. Application Data

(63) Continuation of application No. 11/275,199, filed on Dec. 19, 2005, now Pat. No. 7,216,076, which is a continuation of application No. 09/998,959, filed on Nov. 1, 2001, now Pat. No. 7,006,969.

(60) Provisional application No. 60/245,139, filed on Nov. 2, 2000.

(51) Int. Cl.
*G10L 15/06* (2006.01)
*G10L 15/00* (2006.01)
*G10L 15/04* (2006.01)

(52) U.S. Cl. .................... 704/243; 704/238; 704/254

(58) Field of Classification Search .................... None
See application file for complete search history.

(56) References Cited

U.S. PATENT DOCUMENTS

| | | | |
|---|---|---|---|
| 4,078,154 A | 3/1978 | Suzuki et al. | |
| 4,292,471 A | 9/1981 | Kuhn et al. | |
| 4,601,054 A | 7/1986 | Watari et al. | |
| 4,907,276 A | 3/1990 | Aldersberg | |
| 4,956,865 A | 9/1990 | Lennig et al. | |
| 5,140,668 A | 8/1992 | Hattori | |
| 5,150,449 A | 9/1992 | Yoshida et al. | |
| 5,163,111 A | 11/1992 | Baji et al. | |
| 5,426,745 A | 6/1995 | Baji et al. | |

(Continued)

FOREIGN PATENT DOCUMENTS

EP 0 750 293 12/1996

OTHER PUBLICATIONS

Libby et al., "Robust Speech Recognition Using Singular Value Decomposition Based Speech Enhancement", TELCON '97, IEEE Region 10 Annual Conference, Dec. 2, 1997, pp. 257-260.

(Continued)

*Primary Examiner*—David Hudspeth
*Assistant Examiner*—Brian L. Albertalli

(57) ABSTRACT

A system and method of recognizing speech comprises an audio receiving element and a computer server. The audio receiving element and the computer server perform the process steps of the method. The method involves training a stored set of phonemes by converting them into n-dimensional space, where n is a relatively large number. Once the stored phonemes are converted, they are transformed using single value decomposition to conform the data generally into a hypersphere. The received phonemes from the audio-receiving element are also converted into n-dimensional space and transformed using single value decomposition to conform the data into a hypersphere. The method compares the transformed received phoneme to each transformed stored phoneme by comparing a first distance from a center of the hypersphere to a point associated with the transformed received phoneme and a second distance from the center of the hypersphere to a point associated with the respective transformed stored phoneme.

20 Claims, 9 Drawing Sheets

U.S. PATENT DOCUMENTS

| | | |
|---|---|---|
| 5,471,557 A | 11/1995 | Chung et al. |
| 5,481,644 A | 1/1996 | Inazumi |
| 5,509,103 A | 4/1996 | Wang |
| 5,566,270 A | 10/1996 | Albesano et al. |
| 5,583,968 A | 12/1996 | Trompf |
| 5,621,858 A | 4/1997 | Stork et al. |
| 5,638,489 A | 6/1997 | Tsuboka |
| 5,680,481 A | 10/1997 | Prasad et al. |
| 5,745,874 A | 4/1998 | Neely |
| 5,749,066 A | 5/1998 | Nussbaum |
| 5,946,653 A | 8/1999 | Campbell et al. |
| 6,246,982 B1 | 6/2001 | Beigi et al. |
| 6,321,200 B1 | 11/2001 | Casey |

OTHER PUBLICATIONS

Paul W. Cooper, "The Hypersphere in Pattern Recognition", Information and Control, 5(4):324-346, Dec. 1962.

Smith et al., "Template Adaptationin a Hypersphere Word Classifier", Acoustics, Speech, and Signal Processing, 1990, ICASSP-90, Apr. 3-6, 1990, vol. 1, pp. 565-568.

Ostendorf et al., "A stochastic segment model for phoneme-based continuous speech recognition", Acoustics, Speech and Signal Processing, vol. 37, Issue 12, Dec. 1989, pp. 1857-1869.

SYSTEM AND METHOD OF PATTERN RECOGNITION IN VERY HIGH-DIMENSIONAL SPACE

PRIORITY APPLICATIONS

The present patent application claims priority to U.S. patent application Ser. No. 11/275,199, filed on Dec. 19, 2005, which claims priority to U.S. patent application Ser. No. 09/998,959 filed on Nov. 1, 2001, which claims priority from Provisional Patent Application No. 60/245,139 filed Nov. 2, 2000. The contents of the provisional patent application and non-provisional patent application are incorporated herein by reference.

BACKGROUND OF THE INVENTION

1. Field of the Invention

The present invention relates generally to speech recognition and more specifically to a system and method of enabling speech pattern recognition in high-dimensional space.

2. Discussion of Related Art

Speech recognition techniques continually advance but have yet to achieve an acceptable word error rate. Many factors influence the acoustic characteristics of speech signals besides the text of the spoken message. Large acoustic variability exists among men, women, and different dialects and causes the greatest obstacle in achieving high accuracy in automatic speech recognition (ASR) systems. ASR technology presently delivers a reasonable performance level of around 90% correct word recognition for carefully prepared "clean" speech. However, performance degrades for unprepared spontaneous real speech.

Since speech signal vary widely from word to word, and also within individual words, ASR systems analyze speech using smaller units of sound refereed to as phonemes. The English language comprises approximately 40 phonemes, with average durations of approximately 125 msec. The duration of a phoneme can vary considerably from one phoneme to another and from one word to another. Other languages may have as many as 45 or as few as 13. A string of phonemes comprise words that form the building blocks for sentences, paragraphs and language. Although the number of phonemes used in the English language is not very large, the number of acoustic patterns corresponding to these phonemes can be extremely large. For example, people using different dialects across the United States may use the same 40 phonemes, but pronounce them differently, thus introducing challenges to ASR systems. A speech recognizer must be able to map accurately different acoustic realizations (dialects) of the same phoneme to a single pattern.

The process of speech recognition involves first storing a series of voice patterns. A variety of speech recognition databases have previously been tested and stored. One such database is the TIMIT database (speech recorded at TI and transcribed at MIT). The TIMIT corpus of read speech was designed to provide speech data for acoustic-phonetic studies and for the development and evaluation of automatic speech recognition systems. The TIMIT database contains broadband recordings of 630 speakers of 8 major dialects of American English, each reading 10 phonetically rich sentences. The database is divided into two parts: "train", consisting of 462 speakers, is used for training a speech recognizer, and "test", consisting of 168 speakers, is used for testing the speech recognizer. The TIMIT corpus includes time-aligned orthographic, phonetic and word transcriptions as well as a 16-bit, 16 kHz speech waveform file for each utterance. The corpus design was a joint effort between the Massachusetts Institute of Technology (MIT), SRI International (SRI) and Texas Instruments, Inc. (TI). The speech was recorded at TI, transcribed at MIT and verified and prepared for CD-ROM production by the National Institute of Standards and Technology (NIST).

The 630 individuals were tested and their voice signals were labeled into 51 phonemes and silence from which all words and sentences in the TIMIT database are spoken. The 8 dialects are further divided into male and female speakers. "Labeling" is the process of cataloging and organizing the 51 phonemes and silence into dialects and male/female voices.

Once the phonemes have been recorded and labeled, the ASR process involves receiving the speech signal of a speaking person, dividing the speech signal into segments associated with individual phonemes, comparing each such segment to each stored phoneme to determine what the individual is saying. All speech recognition methods must recognize patterns by comparing an unknown pattern with a known pattern in memory. The system will make a judgment call as to which stored phoneme pattern relates most closely to the received phoneme pattern. The general scenario requires that you already have stored a number of patterns. The system desires to determine which one of the stored patterns relates to the received pattern. Comparing in this sense means computing some distance, scoring function, or some kind of index of similarity in the comparison between the stored value and the received value. That measure decides which of the stored patterns is close to the received pattern. If the received pattern is close to a certain stored pattern, then the system returns the stored pattern as being recognized as associated with the received pattern.

The success rate of many speech recognition systems in recognizing phonemes is around 75%. The trend in speech recognition technologies has been to utilize low-dimensional space in providing a framework to compare a received phoneme with a stored phoneme to attempt to recognize the received phone. For example, see S. B. Davis and P. Mermelstein entitled "Comparison of Parametric Representations for Monosyllabic Word Recognition in Continuously Spoken Sentences", IEEE Transactions on Acoustics, Speech and Signal Processing, Vol. ASSP 28 No. 4 pp. 357-366, August, 1980; U.S. Pat. No. 4,956,865 to Lennig, et al. There are difficulties in using low dimensional space for speech recognition. Each phoneme can be represented as a point in a multidimensional space. As is known in the art, each phoneme has an associated set of acoustic parameters, such as, for example, the power spectrum and/or cepstrum. Other parameters may be used to characterize the phonemes. Once the appropriate parameters are assigned, a scattered cloud of points in a multi-dimensional space represents the phonemes.

FIG. 1 represents a scatter plot 10 of the phoneme /aa/ and phoneme /s/. The scatter plot 10 is in two-dimensional space of energy in two frequency bands. The horizontal axis 12 represents the energy in the frequency band between 0 to 1 kHz within each phoneme and the vertical axis 14 represents the energy of the phonemes between 2 and 3 kHz. In order for a speech recognizer to discriminate one phoneme from another, the respective clouds must not overlap. Although there is a heavy concentration of points in the main body of clouds, significant scatter exists at the edges creating confusion between two phonemes. Such scatter could be avoided if the boundaries of these clouds are distinct and have sharp edges.

The dominant technology used in ASR is called the "Hidden Markov Model", or HMM. This technology recognizes speech by estimating the likelihood of each phoneme at contiguous, small regions (frames) of the speech signal. Each word in a vocabulary list is specified in terms of its component phonemes. A search procedure, called Viterbi search, is used to determine the sequence of phonemes with the highest likelihood. This search is constrained to only look for phoneme sequences that correspond to words in the vocabulary list, and the phoneme sequence with the highest total likelihood is identified with the word that was spoken. In standard HMMs, the likelihoods are computed using a Gaussian Mixture Model. See Ronald A. Cole, et al., "Survey of the State of the Art in Human Language Technology, National Science Foundation," Directorate XIII-E of the Commission of the European Communities Center for Spoken Language Understanding, Oregon Graduate Institute, Nov. 21, 1995 (http://cslu.cse.ogi.edu/HLTsurvey/HLTsurvey.html).

However, statistical pattern recognition by itself cannot provide accurate discrimination between patterns unless the likelihood for the correct pattern is always greater than that of the incorrect pattern. FIG. 1 illustrates the difficulty in using the statistical models. It is difficult to insure that the probabilities that the correct or incorrect pattern will be recognized, do not overlap.

The "holy grail" of ASR research is to allow a computer to recognize with 100% accuracy all words that are intelligibly spoken by any person, independent of vocabulary size, noise, speaker characteristics and accent, or channel conditions. Despite several decades of research in this area, high word accuracy (greater than 90%) is only attained when the task is constrained in some way. Depending on how the task is constrained, different levels of performance can be attained. If the system is trained to learn an individual speaker's voice, then much larger vocabularies are possible, although accuracy drops to somewhere between 90% and 95% for commercially-available systems.

SUMMARY OF THE INVENTION

What is needed to solve the deficiencies of the related art is an improved system and method of sampling speech into individual segments associated with phonemes and comparing the phoneme segments to a database such as the TIMIT database to recognize speech patterns. To improve speech recognition, the present invention proposes to represent both stored and received phoneme segments in high-dimensional space and transform the phoneme representation into a hyperspherical shape. Converting the data in a hyperspherical shape improves the probability that the system or method will correctly identify each phoneme. Essentially, as will be discussed herein, the present invention provides a system and a method for representing acoustic signals in a high-dimensional, hyperspherical space that sharpens the boundaries between different speech pattern clusters. Using clusters with sharp boundaries improves the likelihood of correctly recognizing correct speech patterns.

The first embodiment of the invention comprises a system for speech recognition. The system comprises a computer, a database of speech phonemes, the speech phonemes in the database having been converted into n-dimensional space and transformed using singular value decomposition into a geometry associated with a spherical shape. A speech-receiving device receives audio signals and converts the analog audio signals into digital signals. The computer converts the audio digital signals into a plurality of vectors in n-dimensional space. Each vector is transformed using singular value decomposition into a spherical shape. The computer compares a first distance from a center of the n-dimensional space to a point associated with a stored speech phoneme with a second distance from the center of the n-dimensional space to a point associated with the received speech phoneme. The computer recognizes the received speech phoneme according to the comparison. While the invention preferably comprises a computer performing the transformation, conversion and comparison operations, it is contemplated that any similar or future developed computing device may accomplish the steps outlined herein.

The second embodiment of the invention comprises a method of recognizing speech patterns. The method utilizes a database of recorded and catalogued speech phonemes. In general, the method comprises transforming the stored phonemes or vectors into n-dimensional, hyperspherical space for comparison with received audio speech phonemes. The received audio speech phonemes are also characterized by a vector and converted into n-dimensional space. By transforming the database signal and the received voice signal to high-dimensional space, a sharp boundary will exist. The present invention uses the resulting sharp boundary between different phonemes to improve the probability of correct speech pattern recognition.

The method comprises determining a first vector as a time-frequency representation of each phoneme in a database of a plurality of stored phonemes, transforming each first vector into an orthogonal form using singular-value decomposition. The method further comprises receiving an audio speech signal and sampling the audio speech signal into a plurality of the received phonemes and determining a second vector as a time-frequency representation of each received phoneme of the plurality of phonemes. Each second vector is transformed into an orthogonal form using singular-value decomposition. Each of the plurality of phonemes is recognized according to a comparison of each transformed second vector with each transformed first vector.

An example length of a phoneme is 125 msec and a preferred value for "n" in the n-dimensional space is at least 100 and preferably 160. This value, however, is only preferable given the present technological processing capabilities. Accordingly, it is noted that the present invention is more accurate in higher dimensional space. Thus, the best mode of the invention is considered to be the highest value of "n" that processors can accommodate.

Generally, the present invention involves "training" a database of stored phonemes to convert the database into vectors in high-dimensional space and to transform the vectors geometrically into a hypersphere shape. The transformation occurs using singular value decomposition or some other similar algorithm. The transformation conforms the vectors such that all the points associated with each phoneme are distributed in a thin-shelled hypersphere for more accurate comparison. Once the data is "trained," the present invention involves receiving new audio signals, dividing the signal into individual phonemes that are also converted to vectors in high-dimensional space and transformed into the hypersphere shape. The hypersphere shape in n-dimensional space has a center and a radius for each phoneme. The received audio signal converted and transformed into the high-dimensional space also has a center and a radius.

The first radius of the stored phoneme (the distance from the center of the sphere to the thin-shelled distribution of data points associated with the particular phoneme) and the second radius of the received phoneme (the distance from the center of the sphere to the data point on or near the surface of the sphere) are compared to determine which of the stored phonemes the received phoneme most closely corresponds.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

The present invention may be understood with reference to the attached drawings and the following description. The present invention provides a method, system and medium for representing phonemes with a statistical framework that sharpens the boundaries between phoneme classes to improve speech recognition. The present invention ensures that probabilities for correct and incorrect pattern recognition do not overlap or have minimal overlap.

Figure 2:
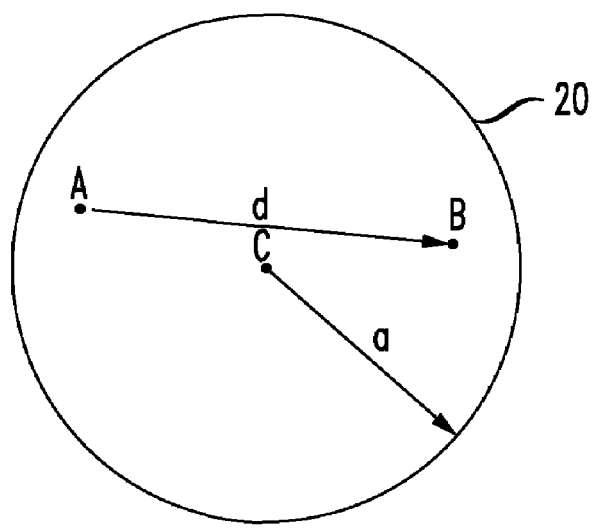
FIG. 2 represents an example of a hypersphere illustrating the principles of the first embodiment of the invention.

The present invention includes several different ways to recognize speech phonemes. Several mathematical models are available for characterizing speech signals. FIG. 2 illustrates a model that relates to a probability between two points A and B in a hypersphere 20 that is predicted using a fairly complex probability density function. In large dimensional space, the distance AB between two points A and B is almost always nearly the same, which is an unexpected result. The hypersphere 20 of n-dimensional space illustrates the mathematical properties used in the present invention. For this example, n may be small (around 10) or large (around 500). The exact number for n is not critical for the present invention in that various values for n are disclosed and discussed herein. The present disclosure is not intended to be limited to any specific values of n.

FIG. 2 illustrates the problem of a distribution of distances between two points A and B in the hypersphere of n dimensions. As shown, the distance between A and B is represented as "d," the center of the hypersphere is "C" and the radius of the hypersphere is represented as "a". Suppose that the two points A and B are represented by vectors $x_1$ and $x_2$. According to an aspect of the present invention, the probability density function is $P(d)$, $d=|x_1-x_2|$ when A and B are uniformly distributed over the hypersphere.

It can be shown that $P(d)$ is given by $$P(d) = nd^{n-1}a^{-n}I_\mu(\tfrac{1}{2}n+\tfrac{1}{2},\tfrac{1}{2}) \qquad (1)$$

where $\mu = 1 - d^2/4a^2$, n corresponds to a number of dimensions and $I_\mu$ is an incomplete Beta function. The incomplete Beta function $I_x(p,q)$ is defined as:

$$I_x(p,q) = \frac{\Gamma(p+q)}{\Gamma(p)\Gamma(q)} \int_0^x t^{p-1}(1-t)^{q-1} dt \qquad (2)$$

Figure 3:
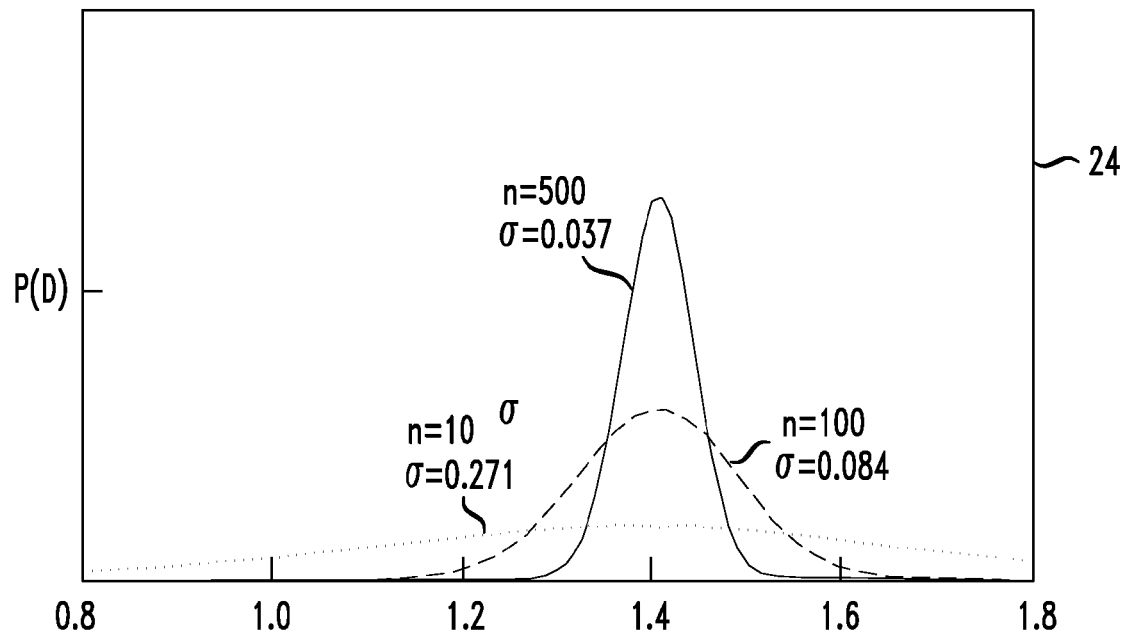
FIG. 3 is an exemplary probability density function measuring the probability of recognizing a distance D between any two points in n-dimensional space for three values of n.

A Beta function or beta distribution is used to model a random event whose possible set of values is some finite interval. It is expected that those of ordinary skill in the art will understand how to apply and execute the formulae disclosed herein to accomplish the designs of the present invention. The reader is directed to a paper by R. D. Lord, "The distribution of distance in a hypersphere", Annals of Mathematical Statistics, Vol. 25, pp. 794-798, 1954. FIG. 3 illustrates a plot 24 of the density function P(D) for three values of n (n=10, 100, 500), where D is the normalized distance, $D=d/(a\sqrt{n})$. The horizontal axis is shown in units of $a\sqrt{n}$. The density function has a single maximum located at the average value of $\sqrt{2}$. The standard deviation a decreases with increasing value of n. It can be shown that when n becomes large, the density function of D tends to be Gaussian with a mean of $\sqrt{2}$ and a standard deviation proportional to $a/\sqrt{(2n)}$. That is, the standard deviation approaches zero as n becomes large. Thus, for large n, the distance AB between the two points A and B is almost always the same.

For large n, the standard deviation a of d is directly proportional to the radius "a" of the hypersphere and inversely proportional to $\sqrt{n}$. The value of "a" is determined by the characteristics of the acoustic parameters used to represent speech and obviously "a" should be small for small σ. But, the standard deviation σ can be reduced also by increasing the dimension n of the space. As is shown in FIG. 3, with n=1, the standard deviation σ is 0.271; for n=100, σ=0.084; and for n=500, σ=0.037. Therefore, the larger the dimension n, the better it is for achieving accurate recognition.

As will be discussed below, the result that for a large value of n, the distance AB between two points A and B is almost always nearly the same may be combined with the accurate prediction of a distance of a point from the center of the hypersphere to more accurately recognize speech patterns.

Figure 4:
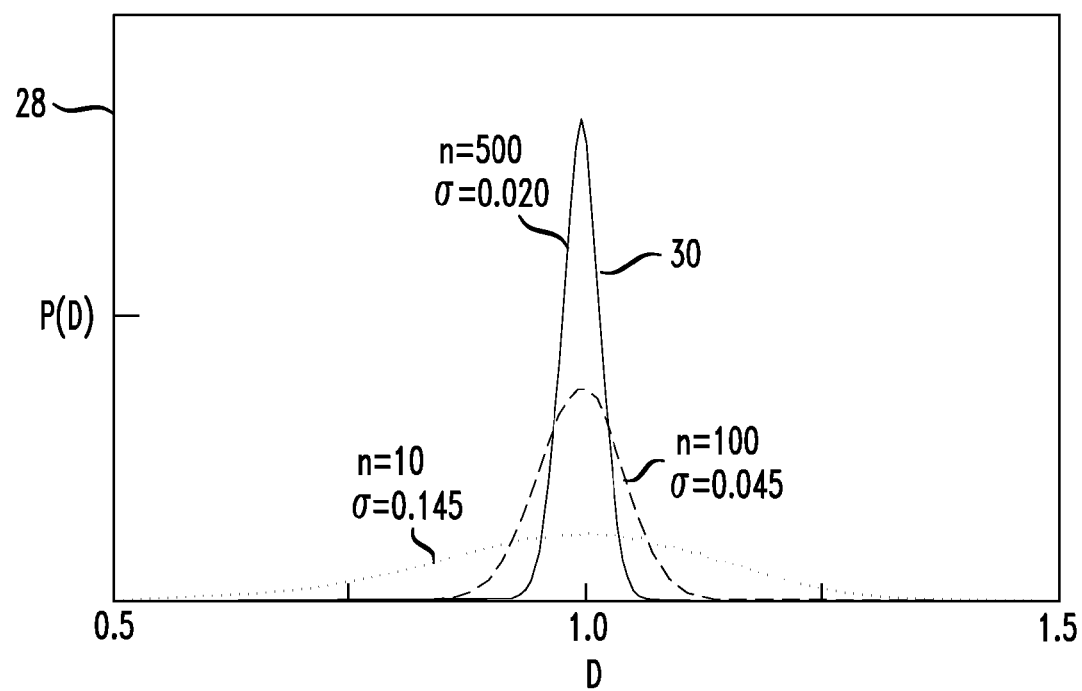
FIG. 4 is an exemplary probability density function measuring the probability of recognizing a distance D from the center of the n-dimensional space for three values of n.

FIG. 4 illustrates the distribution of distances between a point from the center in a hypersphere in n dimensions. This figure aids in explaining, according to the present invention, (1) how the probability densities for two points uniformly distributed over a hypersphere and (2) how the probability densities of distances of points on the hypersphere from its center will enable improved speech pattern recognition in high-dimensional space.

Referring to the plot 28 in FIG. 4, let x represent a vector determining a point in the hypersphere and let P(D) be the probability density function of a normalized distance $D=d/(a\sqrt{n})$. The following equation is for a uniform distribution of points in a hypersphere of radius "a":

$$P(d) = nd^{n-1}a^{-n} (0 \le d \le a) \quad (3)$$
$$= 0 \quad (d > a)$$

It can be shown that when n becomes large, the probability density function of d, for $0 \le d \le a$, tends to be Gaussian with mean "a" and standard deviation $a/\sqrt{n}$. That is, for a fixed "a", the standard deviation approaches zero as the number of dimensions n becomes large. In absolute terms, the standard deviation of d remains constant with increasing dimensionality of the space whereas the radius goes on increasing proportional to $\sqrt{n}$.

The values shown in FIG. 4 are for n=10, σ=0.145; for n=100, σ=0.045, and for n=500, σ=0.020. This illustrates that for higher n values, such as 500, the scatter clouds in 500 dimensional space will have sharp edges which is a desirable situation for accurate discrimination of patterns (note the probability density function 30 in FIG. 4 for n=500). In the probability density distribution shown in FIG. 4, equation (3) may be P(D) with D being the distance from the center of the hypersphere to the point of interest. It is preferable to use the normalized distance D as the variable associated with the probability density function of FIG. 4.

When using these calculations for speech recognition, it is necessary to determine how much volume of the plotted phonemes lies around the radius of the hypersphere. The fraction of volume of a hypersphere which lies at values of the radius between a-ε and a, where 0<ε<a, is given by equation (4):

$$f = 1 - [1 - \epsilon/a]^n \quad (4)$$

Here, f is the fraction of the volume of the phoneme representation lying between the radius of the sphere and a small value a-ε near the circumference. For a hypersphere of n dimensions where n is large, almost all the volume is concentrated in a thin shell dose to the surface. For example, the fraction of volume that lies within a shell of width a/100 is 0.095 for n=10, 0.633 for n=100, and 0.993 for n=500.

Although these results were described for uniform distributions, similar results hold for more general multi-dimensional Gaussian distributions with ellipsoidal contours of equal density. As with the case described above, for large n the distribution is concentrated around a thin ellipsoidal shell near the boundary.

The foregoing provides an introduction into the basic features supporting the present invention. The preferred database of phonemes used according to the present invention is the DARPA TIMIT continuous speech database, which is available with all the phonetic segments labeled by human listeners. The TIMIT database contains a total of 6300 utterances (4620 utterances in the training set and 1680 utterances in the test set), 10 sentences spoken by each of 630 speakers (462 speakers in the training set and 168 speakers in the test set) from 8 major dialect regions of the United States. The original 52 phone labels used in the TIMIT database were grouped into 40 phoneme classes. Each class represents one of the basic "sounds" that are used in the United States for speech communication. For example, /aa/ and /s/ are examples of the 40 classes of phonemes.

While the TIMIT database is preferably used for United States applications, it is contemplated that other databases organized according to the differing dialects of other countries will be used as needed. Accordingly, the present invention is clearly not limited to a specific phoneme database.

Figure 5:
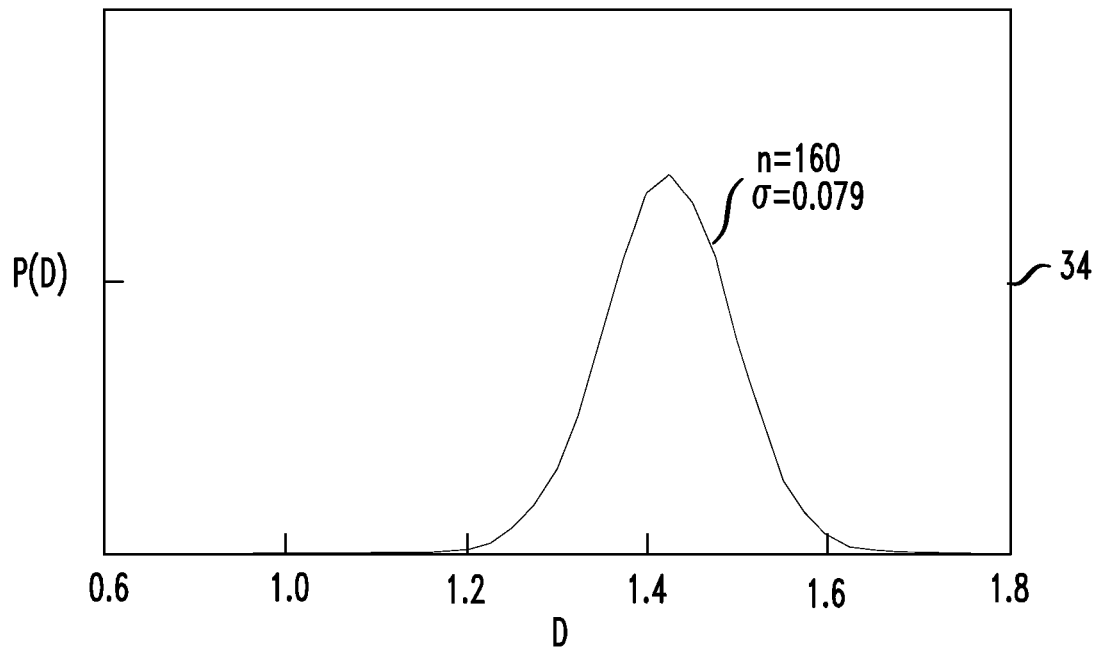
FIG. 5 is a graph of a probability density function of a normalized distance between any two points for a phoneme in the TIMIT database.
Figure 6:
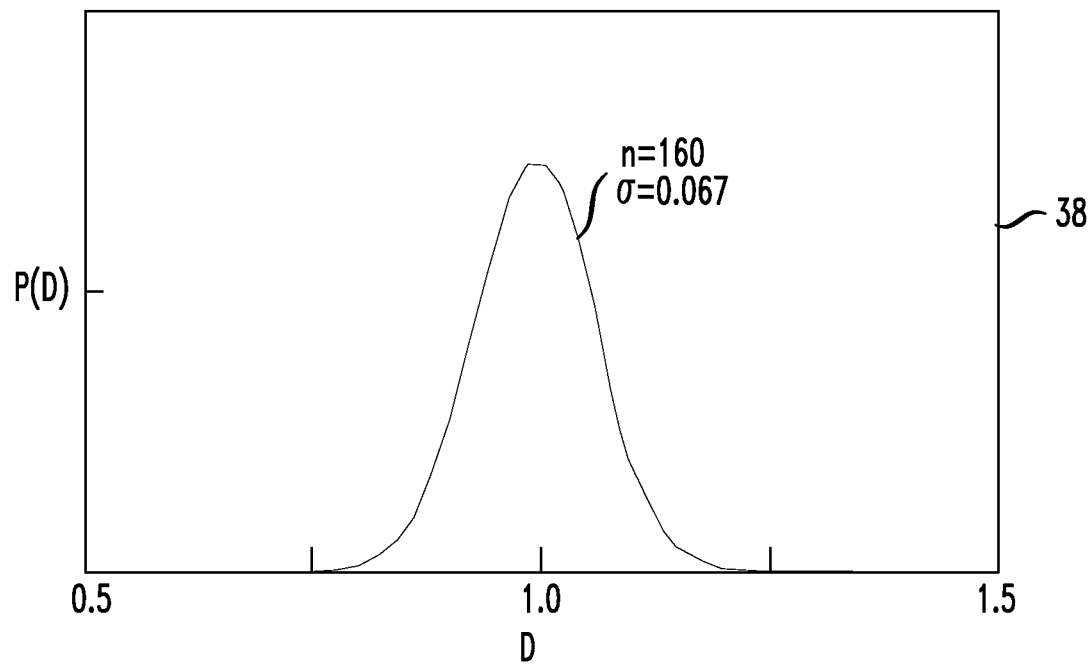
FIG. 6 is a graph of a probability density function of a normalized distance from the center of an n-dimensional space for a phoneme in the TIMIT database.

FIG. 5 illustrates a plot 34 of a probability density function P(D) of a normalized distance $D=d/(a\sqrt{n})$ between any two points for the phoneme class /aa/ in a TIMIT database. As is shown in FIG. 6, for n=160, the standard deviation σ=0.079. The mean and standard deviation for this case were found to be 1.422 and 0.079 respectively. The results of studying other phone classes were similar to that shown in FIG. 4 with standard deviations ranging from 0.070 to 0.092.

FIG. 6 illustrates a plot 38 of a probability density function of a normalized distance $D=d/(a\sqrt{n})$ from the center of a multidimensional space for a phoneme class /aa/ in the TIMIT database. As is shown in FIG. 5, for n=160, the standard deviation is σ=0.067. Computer simulation results for a Gaussian distribution show that the values of σ corresponding to the cases disclosed in FIGS. 5 and 6 are 0.078 and 0.056 respectively.

Figure 7A:
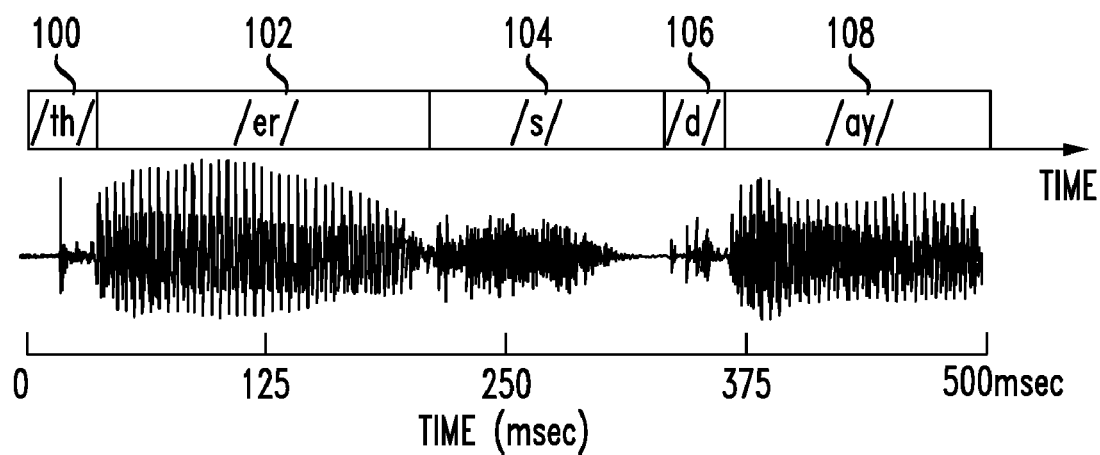
FIGS. 7a-7c illustrate an example of converting phonemes from a database into 160 dimensional space for processing.
Figure 7B:
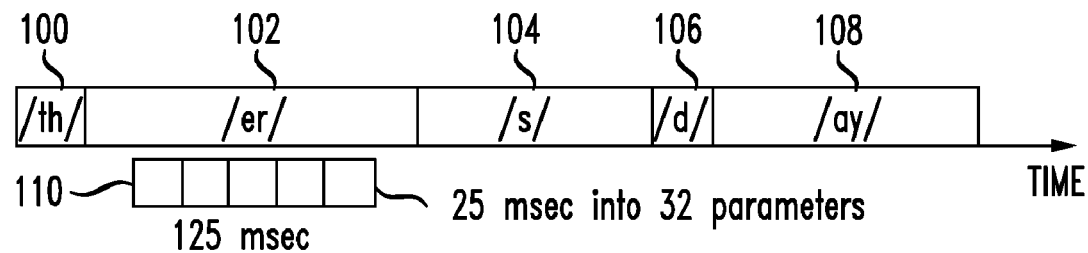
Figure 7C:
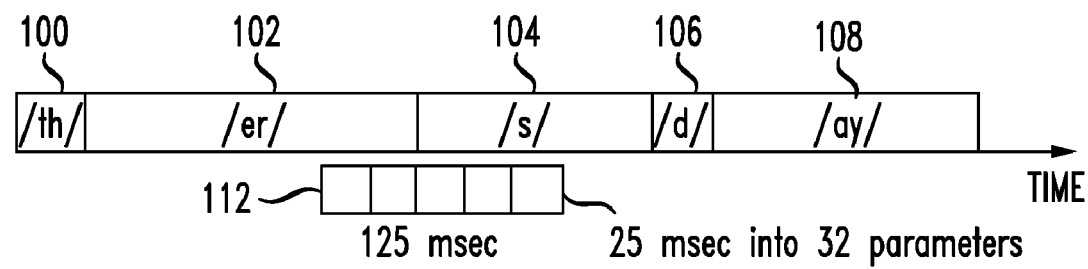

The average duration of a phoneme in these databases is approximately 125 msec. FIG. 7a illustrates a series of five phonemes 100, 102, 104, 106 and 108 for the word "Thursday". Although 125 msec is preferable as the length of a phoneme, the phonemes may also be organized such that they are more or less than 125 msec in length. The phonemes may also be arranged in various configurations. As shown in FIG. 7b, an interval of 125 msec is divided into the five segments of 25 msec each (110). Each 25 msec segment is expanded into a vector of 32 spectral parameters. Although FIGS. 7a-c illustrate the example with 32 mel-spaced spectral parameters, the example is not restricted to spectral parameters and other acoustic parameters can also be used.

The first step according to the invention is to compute a set of acoustic parameters so that each vector associated with a phoneme is determined as a time-frequency representation of 125 msec of speech with 32 mel-spaced filters spaced 25 msec in time. This process is illustrated in FIG. 7b wherein the /er/ phoneme 102 is divided into 5 segments of 25 msec each 110. Each 25 msec segment is expanded into a vector of 32 spectral parameters. In other words, each phoneme represented in the database is divided into 5 of 25 each. Each 25 msec segment is represented using 32 mel-spaced filters into a 160-dimension vector. The vector has 160 dimensions because of the five 25 msec sections times 32 filters equals 160.

In some instances, the phoneme segment 110 may be longer or shorter than 125 msec. If the phoneme is longer than 125 msec, a 125 msec segment that is converted into 160 dimensions may be centered on the phoneme or off-center. FIG. 7b illustrates a centered conversion where the segment 110 is centered on the /er/ phoneme 102. FIG. 7c illustrates an off-center conversion of a phoneme into 160-dimensional space, wherein the /er/ phoneme 102 is divided into a 125 msec segment 112 that overlaps with /s/ phoneme 104. In this manner, a portion of the converted 160-dimensional vector to represent the /er/ phoneme 102 also includes some data associated with the /s/ phoneme 104. Any error introduced through this off-center conversion may be ignored because it might shift slightly the boundaries of the two adjacent phonemes. Once the phonemes have been converted from the 125 msec phoneme to a 160-dimensional vector with five 25 msec segments each with 32 spectral parameters, each 160-dimensional vector is transformed to an orthogonal form using singular-value decomposition. For more information on singular-value decomposition (SVD), see G. W. Stewart, "Introduction to Matrix Computations," Academic Press, New York, 1973. The orthogonal form may be represented as:

$$[x_1 x_2 \ldots x_m] = [u_1 u_2 \ldots u_m] \Lambda V^t \qquad (5)$$

where $x_k$ is the kth acoustic vector for a particular phoneme, $u_k$ is the corresponding orthogonal vector, and $\Lambda$ and $V$ are diagonal and unitary matrices (one diagonal and one unitary matrix for each phoneme), respectively. The standard deviation for each component of the orthogonal vector $u_k$ is 1. Thus, a vector is provided in the acoustic space of 160 dimensions once every 25 msec. The vector can be provided more frequently at smaller time intervals, such as 5 or 10 msec. This representation of the orthogonal form will be similar for both the stored phonemes and the received phonemes. However, in the process, the different kinds of phonemes will of course use different variables to distinguish the received from the stored phonemes in their comparison.

Figure 1:
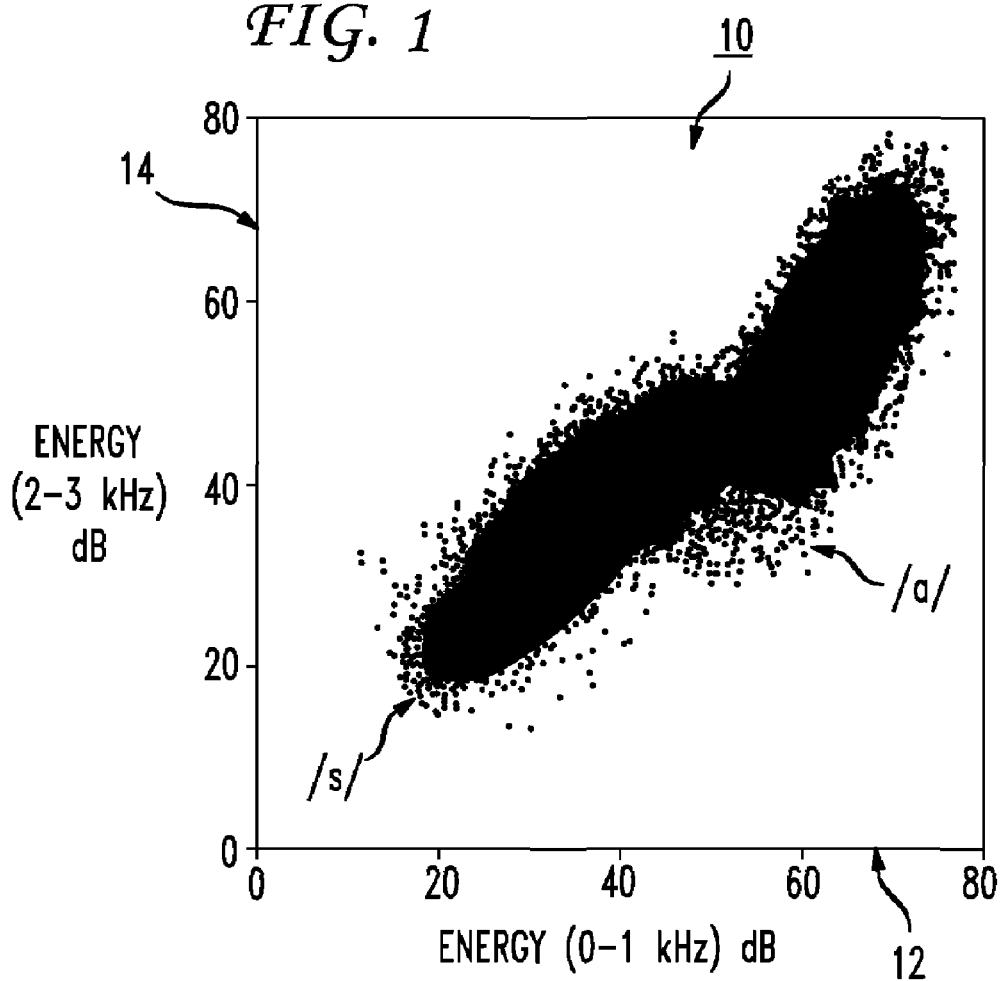
FIG. 1 represents a scatter plot illustrating a prior art statistical method of speech recognition.
Figure 8:
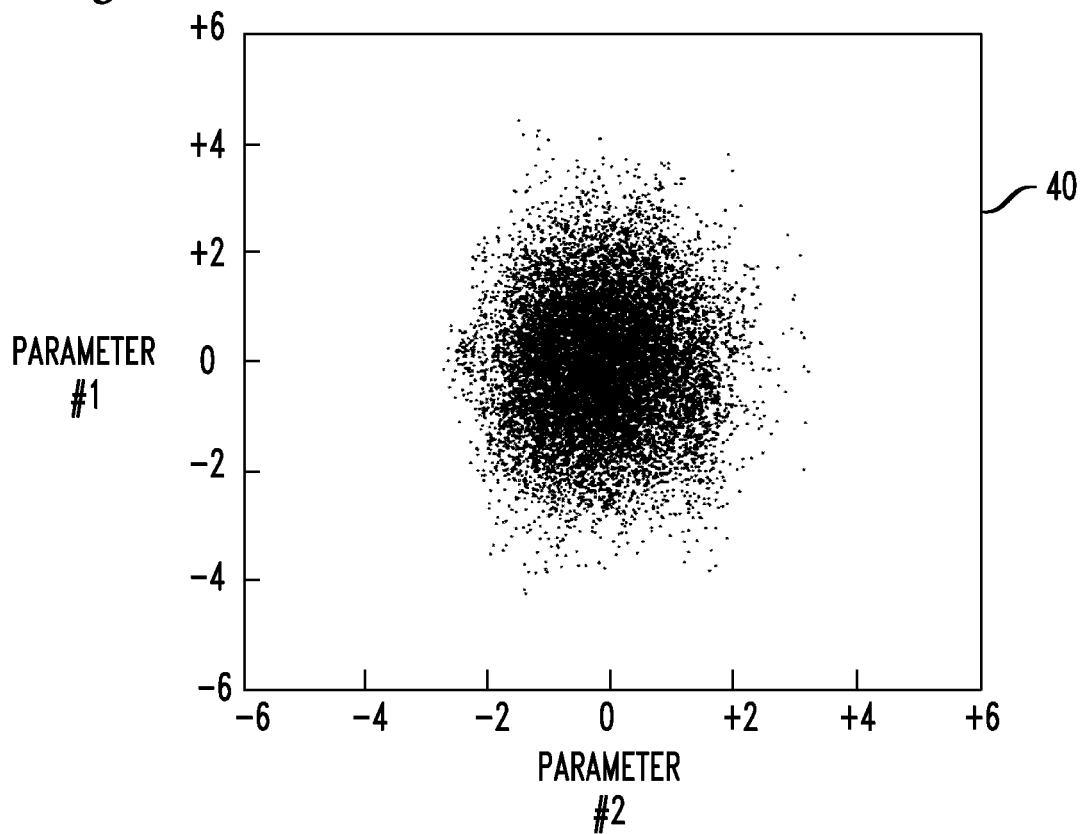
FIG. 8 represents a graph of data points associated with a phoneme converted into spherical 160 dimensional space.

The process of retrieving and transforming phoneme data from a database such as the TIMIT database into 160 dimensional space or some other high-dimensional space is referred to as "training." The process described above has the effect of transforming the data from a distribution similar to that shown in FIG. 1, wherein the data points are elliptical and off-center, to being distributed in a manner illustrated in FIG. 8. FIG. 8 illustrates a plot 40 of the distribution of data points centered in the graph and evenly distributed in a generally spherical form. As discussed above, modifying the phoneme vector data to be in this high-dimensional form enables more accurate speech recognition.

The graph 40 of FIG. 8 is a two-dimensional representation associated with the /aa/ phoneme converted into spherical 160 dimensional space. The boundaries in the figure do not show sharp edges because the figure displays the points in a two-dimensional space. The boundaries, however, are very sharp in the 160 dimensional space as reflected in the distribution of distances of the points from the center of the sphere in FIG. 6 where the distances from the center have a mean of 1 and a standard deviation of 0.067. The selection of 160 dimensional space is not critical to the present invention. Any large dimension capable of being processed by current computing technology will be acceptable according to the present invention. Therefore, as computing power increases, the "n" dimensional space used according to the invention will also increase.

Figure 9:
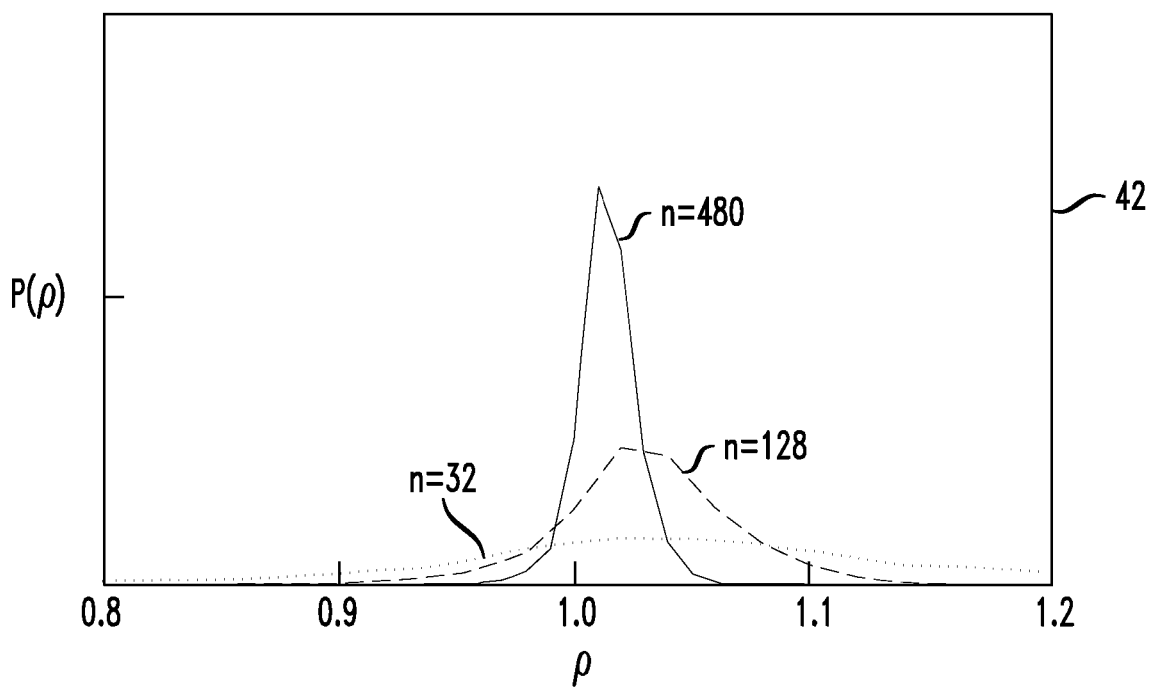
FIG. 9 illustrates the density functions of the ratio p of between-class distance S and with-class distance.

Previously, the focus has been on the distribution of points within a class. However, there may be a separation of classes in high dimensional space. To make this determination, the data is divided the data into two separate classes: a within class distance and a between-class distance. FIG. 9 illustrates a plot of 42 the density functions P($\rho$) of the ratio $\rho$ of between-class distance and within-class distance averaged over the 40 phoneme classes in the TIMIT database for three values of n. The within-class distance is the distance a point is from the correct phoneme class. The between-class distance is the smallest distance from another phoneme class. For accurate speech pattern recognition, the within-class distance for each occurrence of the phoneme must be smaller than the smallest distance from another phoneme.

The ratio $\rho$ is defined as the ratio of the between-class distance and the within-class distance. The individual distances determined every 25 msec are averaged over each phoneme segment in the TIMIT database to produce average between-class and within-class distances for that particular segment.

As shown in FIG. 9, when n=32, the peak of the density function is between 1.0 and 1.1. When n=128, again, the peak is higher for the density function but is centered between 1.0 and 1.1. Finally, when n=480, the density function is closer to being centered at 1.0 and more compact. Since the phonemes were converted into 160 dimensional space, but FIG. 9 illustrates dimensions up to 480, the 32 spectral parameters were expanded into an expanded vector with 96 parameters using a random projection technique as is known in the art, such as the one described in R. Arriaga and S. Vempala, "An algorithmic theory of learning," IEEE Symposium on Foundations of Computer Science, 1999. Preferably, the number of dimensions is at least 100 although it is only limited by processing speed. The tan h nonlinearity function was used to reduce the linear dependencies in the 96 parameters.

Although the present invention is shown as dividing up a phoneme of 125 msec in length for analysis, the present invention also is contemplated as being used to divide up entire words, rather than phonemes. In this regard, a word-length segment of speech may have even more samples that those described herein and can provide a representation with much higher number of dimensions—perhaps 5000.

Figure 10:
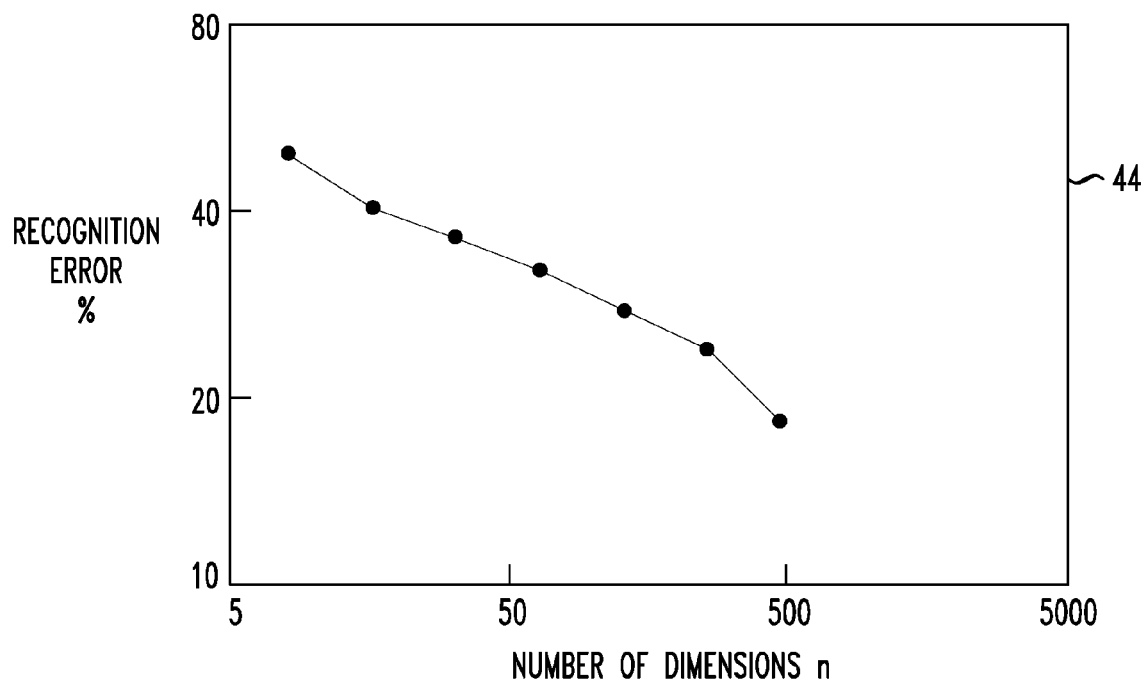
FIG. 10 illustrates the recognition error in relation to the number of dimensions.

The portion of the density function illustrated in FIG. 9 where $\rho$ is smaller than 1 represents an incorrect recognition of the phoneme. Clearly, in FIG. 9, the portion of the density function that is located on the graph below $\rho$=1 decreases with an increasing value of n. Therefore, the higher the value of n, the lower the number of recognition errors. The results are shown in FIG. 10 that illustrates the average recognition error in percent as a function of the number n of dimensions. The recognition error score decreases with increasing value of n, resulting in an average recognition accuracy of around 80% at n=480.

Presently, according to the best mode of the present invention, n=480 is a preferred value. However, there are hardware restraints that drive this determination and as hardware and computational power further increase, it is certainly contemplated that a higher value of n will be used and is contemplated as part of this invention. FIG. 10 illustrates the increased accuracy and recognition error percentage as a function of the number of dimensions n.

FIG. 10 illustrates a plot 44 of the recognition of phonemes in speech is not perfect, but one can achieve a high level of accuracy (exceeding 90%) in recognition of words in continuous speech even in the presence of occasional errors in phoneme recognition. This is possible because spoken languages use a very small number of words as compared to what is possible with all the phonemes. For example, one can have more than a billion possible words with five phonemes. In reality, however, the vocabulary used in English is less than a few million. The lexical constraints embodied in the pronunciation of words make it possible to recognize words in the presence of mis-recognized phonemes. For example, the word "lessons" with /l eh s n z/ as the pronunciation could be recognized as /l ah s ah z/ with two errors, the phonemes /eh/ and /n/ mis-recognized as /ah/ and /ah/, respectively. Accurate word recognition can be achieved by finding 4 closest phonemes, not just the closest one in comparing distances.

The word accuracy for 40 phonemes using 4 best (closest) phonemes is presented in Table 1. The average accuracy is 86%. Most of the phoneme errors occur when similar sounding phonemes are confused. The phoneme recognition accuracy goes up to 93% with 20 distinct phonemes as shown Table 2.

TABLE 1

| No | Phoneme Symbol | Word example | % correct |
|---|---|---|---|
| 1 | ah | but | 97 |
| 2 | aa | bott | 86 |
| 3 | ih | bit | 96 |
| 4 | iy | beet | 95 |
| 5 | uh | book | 58 |
| 6 | uw | boot | 56 |
| 7 | ow | boat | 93 |
| 8 | aw | bout | 36 |
| 9 | eh | bet | 90 |
| 10 | ae | bat | 62 |
| 11 | ey | bait | 75 |
| 12 | ay | bite | 80 |
| 13 | oy | boy | 55 |
| 14 | k | key | 98 |
| 15 | g | gay | 89 |
| 16 | ch | choke | 89 |
| 17 | jh | joke | 87 |
| 18 | th | thin | 94 |
| 19 | dh | then | 80 |
| 20 | t | tea | 95 |
| 21 | d | day | 90 |
| 22 | dx | dirty | 86 |
| 23 | p | pea | 80 |
| 24 | b | bee | 49 |
| 25 | m | mom | 97 |
| 26 | n | noon | 98 |
| 27 | ng | sing | 91 |
| 28 | y | yacht | 39 |
| 29 | r | ray | 91 |
| 30 | er | bird | 93 |
| 31 | l | lay | 91 |
| 32 | el | bottle | 83 |
| 33 | v | van | 77 |
| 34 | w | way | 82 |
| 35 | s | sea | 97 |
| 36 | sh | she | 96 |
| 37 | hh | hay | 91 |
| 38 | f | fin | 87 |
| 39 | z | zone | 98 |
| 40 | sil |  | 65 |

TABLE 2

| No | Phoneme Symbol | Word example | % correct |
|---|---|---|---|
| 1 | aa | bott | 94 |
| 2 | iy | beet | 95 |
| 3 | ow | boat | 97 |
| 4 | eh | bet | 98 |
| 5 | k | key | 98 |
| 6 | g | gay | 93 |
| 7 | th | thin | 96 |
| 8 | t | tea | 94 |
| 9 | d | day | 93 |
| 10 | p | pea | 86 |
| 11 | b | bee | 72 |
| 12 | m | mom | 98 |
| 13 | n | noon | 98 |
| 14 | ng | sing | 95 |
| 15 | r | ray | 96 |
| 16 | l | lay | 96 |
| 17 | v | van | 89 |
| 18 | s | sea | 91 |
| 19 | sh | she | 94 |
| 20 | f | fin | 87 |

The phoneme recognition results with four closest matches for two words "lessons" and "driving" are illustrated in the example shown below:

"lessons" (l eh s n z)

l ah s ah z
ow ih z n s
ah eh th ih th
aa n t m t

"driving" (d r ay v iy ng)

t eh r v iy ng
d er ah dx ih n
k ah l dh eh m
ch r ay m n iy

The system now recognizes the correct word because the system includes the correct phoneme (in bold type) in one of the four closest phonemes.

Figure 11:
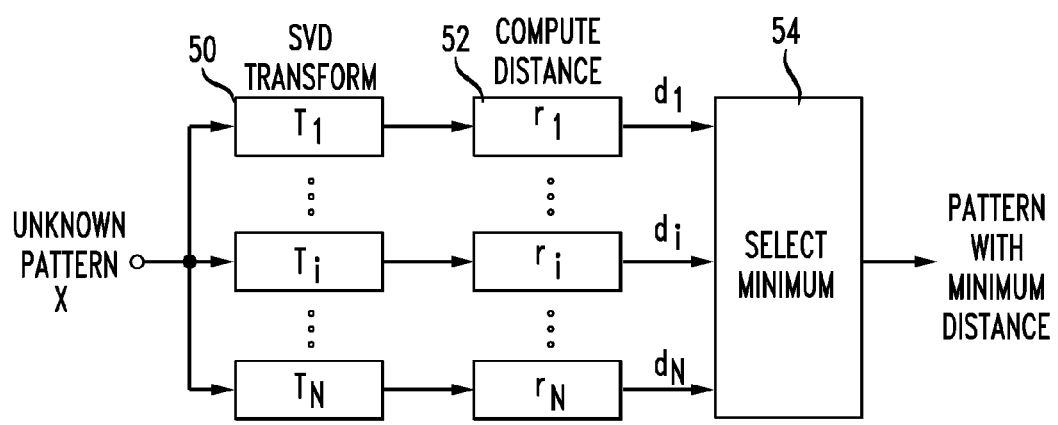
FIG. 11 illustrates an aspect of the recognition process of the present invention.

Having discussed the "training" portion of the present invention, the "recognition" aspect of the invention illustrated in FIG. 11 is discussed next. In this aspect, an unknown pattern x of preferably a speech signal is received and stored after being converted from analog to digital form. The unknown pattern is then transformed into an orthogonal form in approximately 160 dimensional space. The transformed speech sound is then converted using singular value decomposition 50 into a hyperspherical shape having a center. A distance from the received phoneme to each stored phoneme is computed 52. The speech sound is then compared to each stored phoneme class to determine the smallest distance or the m-best distances between the received phoneme and a stored phoneme. A select minimum (or select m-best) module 54 selects the pattern with the minimum distance (or m-best distances) to determine a match of a stored phoneme to the unknown pattern.

Figure 12:
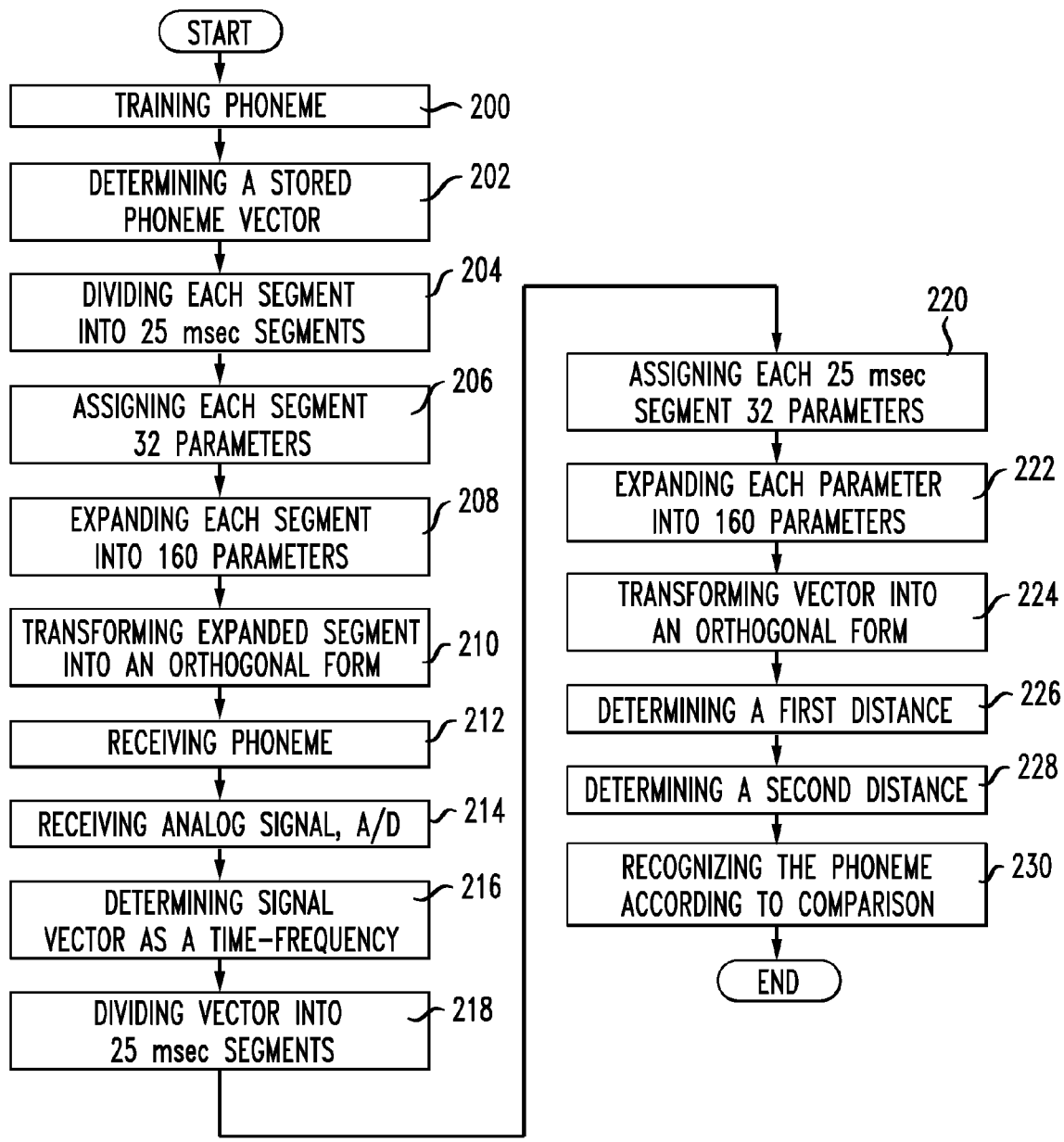
FIG. 12 illustrates an exemplary method according to an embodiment of the invention.

FIG. 12 illustrates a method according to an embodiment of the present invention. The method of recognizing a received phoneme using a stored plurality of phoneme classes uses each of the plurality of phoneme classes comprising at least one stored phoneme. The method comprises training the at least one stored phoneme (200), the training comprising, for each of the at least one stored phoneme: determining a stored phoneme vector (202) as a time-frequency representation of 125 msec of the stored phoneme, dividing the stored phoneme vector into 25 msec segments (204), assigning each 25 msec segment 32 parameters (206), expanding each 25 msec segment with 32 parameters into an expanded stored-phoneme vector with 160 parameters (208).

The method shown by way of example in FIG. 12 further comprises transforming the expanded stored-phoneme vector into an orthogonal form (210). This may be accomplished using singular-value decomposition wherein $[x_1 \ x_2 \ldots x_m] = [u_1 \ u_2 \ldots u_m] \Lambda V^t$, where $x_k$ is a $k^{th}$ acoustic vector for a corresponding stored phoneme, $u_k$ is the corresponding orthogonal vector and $\Lambda$ and $V$ are diagonal and unitary matrices, respectively. Singular-value decomposition is not necessarily the only means to make this transformation. The result of the transformation into an orthogonal form is to conform the data from its present form, which may be elliptical and off-center from an axis system, to be centered and more spherical in geometry. Accordingly, singular-value decomposition is the preferred means of performing this operation, although other means are contemplated.

Having performed the above steps, the stored phonemes from a database such as the TIMIT data base are "trained" and ready for comparison with received phonemes from live speech. The next portion of the method involves recognizing a received phoneme (212). This portion of the method may be considered separate from the training portion in that after a single process of training, the receiving and comparing process occurs numerous times. The recognizing process comprises receiving an analog acoustic signal (214), converting the analog acoustic signal into a digital signal (214), determining a received-signal vector as a time-frequency representation of 125 msec of the received digital signal (216), dividing the received-signal vector into 25 msec segments (218), and assigning each 25 msec segment 32 parameters (220). Once the received phoneme vector have been assigned the 32 parameters, the method comprises expanding each 25 msec segment with 32 parameters into an expanded received-signal vector with 160 parameters (5 times 32) (222) and transforming the expanded received-signal vector into an orthogonal form using singular-value decomposition wherein $[y_k]=[z_k] \Lambda V^t$, where $y_k$ is a $k^{th}$ acoustic vector for a corresponding received phoneme, $z_k$ is the corresponding orthogonal vector and $\Lambda$ and V are diagonal and unitary matrices, respectively (224).

With the transformation of the received phoneme vector data complete, the received data is in high-dimensional space and modified such that the data is centered on an axis system just as the stored data has been "trained" in the first portion of the method. Next, the method comprises determining a first distance associated with the orthogonal form of the expanded received-signal vector (226) and a second distance associated respectively with each orthogonal form of the expanded stored-phoneme vectors (228) and recognizing the received phoneme according to a comparison of the first distance with the second distance (230).

Figure 13:
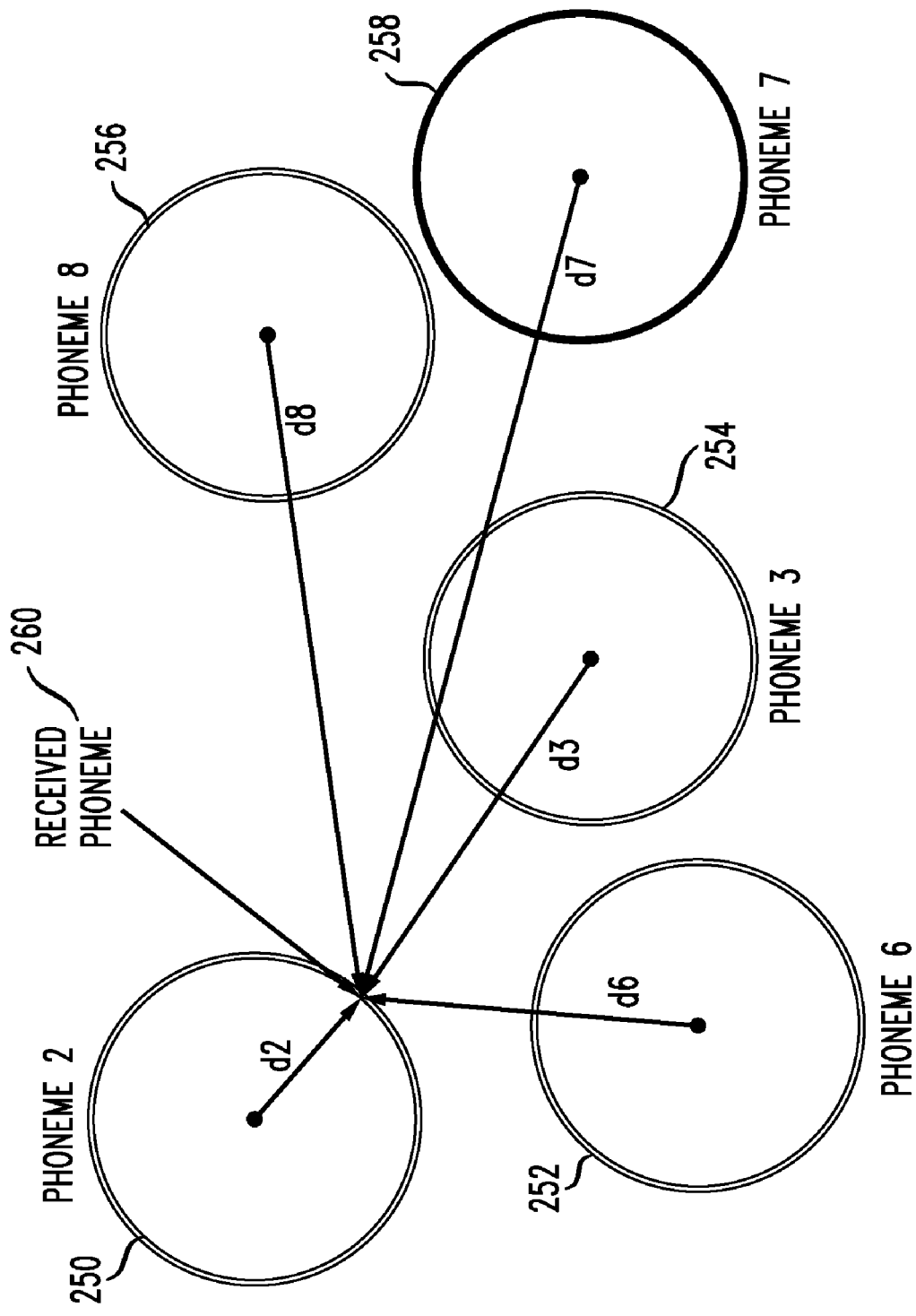
FIG. 13 illustrates geometrically the comparison of a stored phoneme distance to a received phoneme distance in a hypersphere.

The comparison of the first distance with the second distance is illustrated in FIG. 13. This figure shows geometrically the comparison of distances from 5 stored phonemes to a received phoneme (260) in a hypershere. The example shown in FIG. 13 illustrates the distance $d_2$ from phoneme 2 (250), the distance $d_6$ from phoneme 6 (252), the distance $d_3$ from phoneme 3 (254), the distance $d_8$ from phoneme 8 (256), and the distance $d_7$ from phoneme 7 (258) to the received phoneme 260. The double diameter lines for phonemes 2, 3, 6, and 8 represent fuzziness in the perimeter of the phonemes since they are not perfectly smooth spheres. Different phonemes may have different characteristics in their parameters as well, as represented by the bolded diameter of phoneme 7.

As stated earlier with reference to FIG. 12, the method comprises determining a first distance associated with the orthogonal form of the expanded received-phoneme vector (226) and a second distance associated respectively with each orthogonal form of the expanded stored-phoneme vectors (228). In the preferred embodiment of the invention, the "m" best phonemes are selected by determining the probability P(D) as shown in FIG. 6, where D is the distance of the expanded received-phoneme vector from the center of each stored-phoneme vector, comparing the probabilities for various phonemes, and selecting those phonemes with the "m" largest probabilities. As can be seen from the example in FIG. 13, a comparison of the distances $d_2$, $d_3$, $d_6$, $d_7$, and $d_8$ reveals that $d_2$ is the shortest distance. Thus the most likely phoneme match to the received phoneme is phoneme 2 (250).

The present invention and it various aspects illustrate the benefit of representing speech at the acoustic level in high-dimensional space. Overlapping patterns belonging to different classes causes errors in speech recognition. Some of this overlap can be avoided if the clusters representing the patterns have sharp edges in the multidimensional space. Such is the case when the number of dimensions is large. Rather than reducing the number of dimensions, we have used a speech segment of 125 msec and created a set of 160 parameters for each segment. But a larger number of speech parameters may also be used, for example, to 1600 with a speech bandlimited to 8 kHz and 3200 with a speech bandlimited to 8 kHz. Accordingly, the present invention should not be limited to any specific number of dimensions in space.

Figure 14:
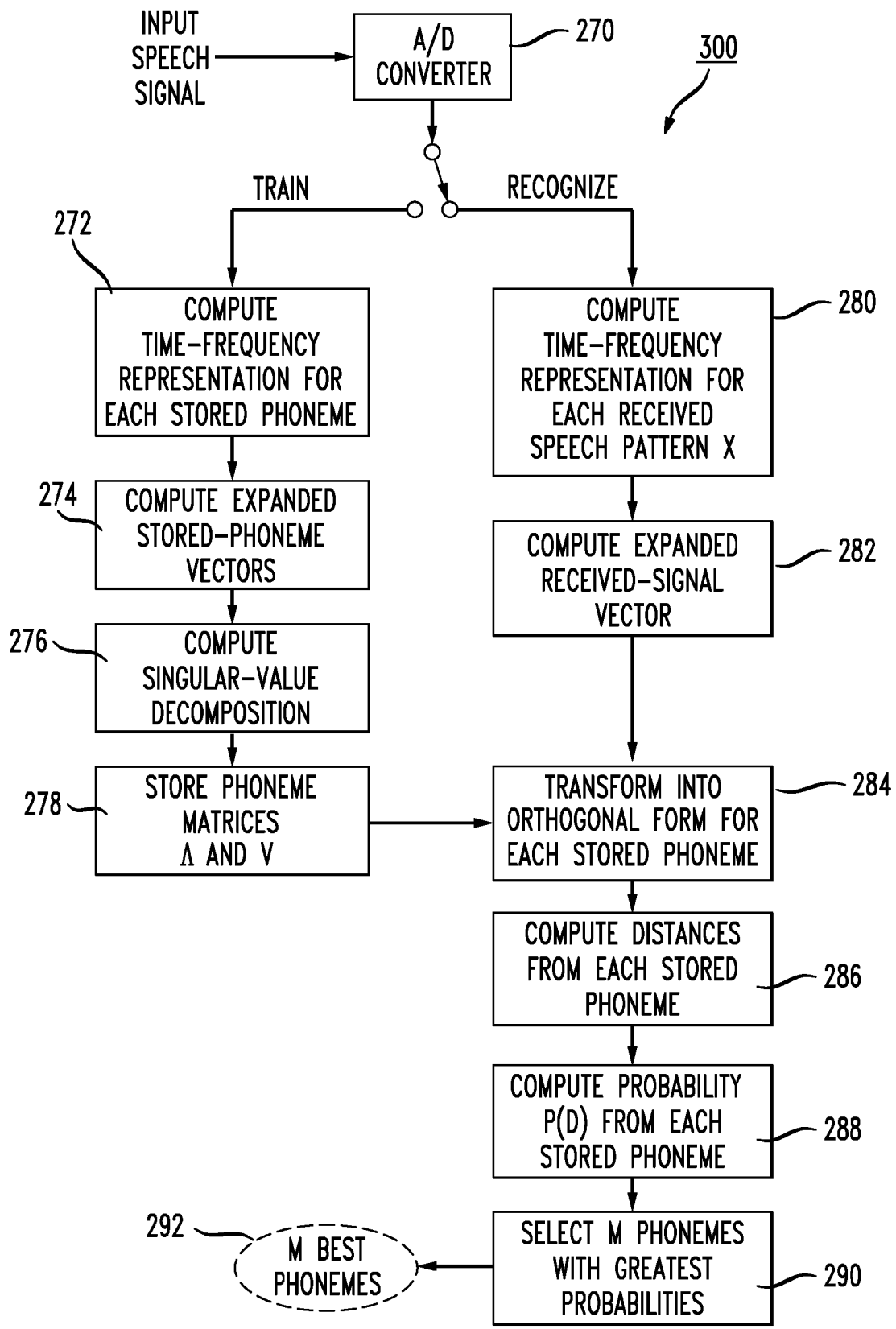
FIG. 14 shows an example block diagram illustrating the approach in a speech recognizer.

FIG. 14 illustrates in a block diagram for a speech recognizer 300 that receives an unknown speech pattern x associated with a receive phone. An A/D converter 270 converts the speech pattern x from an analog form to a digital form. The speech recognizer includes a switch 271 that switches between a training branch of the recognizer, and a recognize branch. The training branch enables the recognizer to be trained and to provide the stored phoneme matrices thereafter used by operating the recognize branch of the speech recognizer.

For each of a series of segments, the speech recognizer 300 computes a time frequency representation for each stored phoneme (272), as described in FIGS. 7a-7c. The recognizer 300 computes an expanded received signal vector (274) in the approximately 160-dimensional space, computes a singular-value decomposition (276), and stores phonemes matrices $\Lambda$ and V (278). The speech recognition branch uses the stored matrices $\Lambda$ and V. After the speech recognizer is trained and the switch 271 changes the operation from train to recognize, the speech recognizer 300 computes the time-frequency representation for each received speech pattern x (280). The recognizer then computes expanded received-signal vectors (282) and transforms the received signal vector into an orthogonal form (284) for each stored phoneme using stored-phonemes matrices $\Lambda$ and V (278) computed in the training process. The recognizer computes a distance from each stored phoneme (286), computes a probability P(D) for each stored phoneme (288), and selects the "m" phonemes with the greatest probabilities (290) to arrive at the "m" best phonemes (292) to match the received phonemes.

Another aspect of the invention relates to a computer-readable medium storing a program for instructing a computer device to recognize a received speech signal using a database of stored phonemes converted into n-dimensional space. The medium may be computer memory or a storage device such as a compact disc. The program instructs the computer device to perform a series of steps related to speech recognition. The steps comprise receiving a received phoneme, converting the received phoneme to n-dimensional space, comparing the received phoneme to each of the stored phonemes in n-dimensional space and recognizing the received phoneme according the comparison of the received phoneme to each of the stored phonemes. Further details regarding the variations and detail of the steps the computer devices takes are discussed above related to the method embodiment of the invention.

Although the above description may contain specific details, they should not be construed as limiting the claims in anyway. Other configurations of the described embodiments of the invention are part of the scope of this invention. Accordingly, the appended claims and their legal equivalents should only define the invention, rather than any specific examples given.

The invention claimed is:

1. A method of training phonemes for use in recognizing a received phoneme having an associated received-signal vector using a stored plurality of phoneme classes, each of the plurality of phoneme classes comprising class phonemes, the method comprising, for each class phoneme:
   generating an expanded stored-phoneme vector from the class phoneme; and
   transforming the expanded stored-phoneme vector into an orthogonal form associated with a hypersphere having a center and a radius, wherein a received phoneme may be recognized by generating an expanded received-signal vector into an orthogonal form for analysis in the hypersphere.

2. The method of claim 1, wherein the generating expanded stored phoneme vector from the class phoneme further comprises:
   determining a phoneme vector as a time-frequency representation of the class phoneme;
   dividing the phoneme vector into phoneme segments;
   assigning each phoneme segment into a plurality of phoneme parameters; and
   expanding each phoneme segment and plurality of phoneme parameters into an expanded stored-phoneme vector with expanded vector parameters.

3. The method of claim 1, wherein transforming the expanded stored-phoneme vector into an orthogonal form further comprises:
   setting $[x_1 x_2 \ldots x_m] = [u_1 u_2 \ldots u_m] \Lambda V^t$, where $x_k$ is a $k^{th}$ acoustic vector for a corresponding stored phoneme, $u_k$ is the corresponding orthogonal vector and $\Lambda$ and $V$ are diagonal and unitary matrices, respectively.

4. The method of claim 1, further comprising transforming the expanded received signal vector which is associated with the received phoneme into an orthogonal form using a singular-value decomposition to conform the expanded received-single signal vector into the hypersphere.

5. A method of recognizing a received phoneme having an associated received-signal vector using a plurality of phoneme classes, each of the plurality of phoneme classes comprising class phonemes, the method comprising:
   generating an expanded received-signal vector from a received analog acoustic signal;
   transforming the expanded received-signal vector into an orthogonal form associated with a hypersphere having a center and a radius;
   determining a first distance associated with the orthogonal form of the expanded received-signal vector and a second distance associated respectfully with each orthogonal form of expanded stored phoneme vectors; and
   recognizing the received phoneme according to a comparison of the first distance with the second distance.

6. The method of claim 5, wherein generating the expanded received-signal vector further comprises:
   receiving the analog acoustic signal;
   converting the analog acoustic signal into a digital signal;
   determining the received-signal vector as a time-frequency representation of the received digital signal;
   dividing the received-signal vector into received-signal segments;
   assigning each received-signal segment into a plurality of received-signal parameters; and
   expanding each received-signal segment and plurality of received-signal parameters into an expanded received-signal vector.

7. The method of claim 5, wherein transforming the expanded received-signal vector into an orthogonal form further comprises:
   setting $[y_k] = [z_k] \Lambda V^t$, where $y_k$ is a $k^{th}$ acoustic vector for a corresponding received phoneme, $z_k$ is the corresponding orthogonal vector and $\Lambda$ and $V$ are diagonal and unitary matrices, respectively.

8. The method of claim 5, wherein transforming the expanded stored phoneme vector into an orthogonal form uses singular-value decomposition and wherein transforming the expanded received-signal vector into an orthogonal form using singular-value decomposition further conforms the stored-phoneme vector into the hypersphere.

9. The method of claim 8, wherein determining a distance associated with the orthogonal form of the expanded received-signal vector and each orthogonal form of the expanded stored-phoneme vectors further comprises:
   comparing a distance from the center of the hypersphere of the orthogonal form of the expanded received-signal vector with a distance from the center of the hypersphere for each orthogonal form of the expanded stored-phoneme vector.

10. The method of claim 9, wherein determining a distance associated with the orthogonal form of the expanded received-signal vector and each orthogonal form of the expanded stored-phoneme vectors further comprises:
    determining a difference between the distance from the center of the hypersphere of the orthogonal form of the expanded received-signal vector and the distance from the center of the hypersphere for each orthogonal form of the expanded stored-phoneme vectors, wherein the expanded stored-phoneme vectors associated with m-shortest differences between the distance from the center of the hypersphere of the orthogonal form of the expanded received-signal vector and the distance from the center of the hypersphere for each orthogonal form of the expanded stored-phoneme vectors are recognized as most likely to be associated with the received phoneme.

11. A computing device for recognizing a received phoneme having an associated received-signal vector using a stored plurality of phoneme classes, each of the plurality of phoneme classes comprising class phonemes, the computing device comprising:
    a module configured to generate an expanded stored-phoneme vector from each respective class phoneme; and
    a module configured to transform the expanded stored-phoneme vector into an orthogonal form associated with a hypersphere having a center and a radius, wherein a received phoneme may be recognized by generating an expanded received-signal vector into an orthogonal form for analysis in the hypersphere.

12. The computing device of claim 11, wherein the module configured to generate the expanded stored phoneme vector from the class phoneme further:
    determines the phoneme vector as a time-frequency representation of the class phoneme;
    divides the phoneme vector into phoneme segments;
    assigns each phoneme segment into a plurality of phoneme parameters; and
    expands each phoneme segment and plurality of phoneme parameters into an expanded stored-phoneme vector with expanded vector parameters.

13. The computing device of claim 11, wherein the module configured to transform the expanded stored-phoneme vector into an orthogonal form further:

sets $[x_1 \ x_2 \ \ldots \ x_m] = [u_1 \ u_2 \ \ldots \ u_m] \Lambda V^t$, where $x_k$ is a $k^{th}$ acoustic vector for a corresponding stored phoneme, $u_k$ is the corresponding orthogonal vector and $\Lambda$ and V are diagonal and unitary matrices, respectively.

14. The computing device of claim 11, further comprising a module configured to transform the expanded received signal vector which is associated with the received phoneme into an orthogonal form using a singular-value decomposition to conform the expanded received-single signal vector into the hypersphere.

15. A computing device for recognizing a received phoneme having an associated received-signal vector using a plurality of phoneme classes, each of the plurality of phoneme classes comprising class phonemes, the computing device comprising:

a module configured to generate an expanded received-signal vector from a received analog acoustic signal;

a module configured to transform the expanded received-signal vector into an orthogonal form associated with a hypersphere having a center and a radius;

a module configured to determine a first distance associated with the orthogonal form of the expanded received-signal vector and a second distance associated with each orthogonal form of expanded stored phoneme vectors; and a module configured to recognize the received phoneme according to a comparison of the first distance with the second distance.

16. The computing device of claim 15, wherein the module configured to generate the expanded received-signal vector further:

receives the analog acoustic signal;

converts the analog acoustic signal into a digital signal;

determines the received-signal vector as a time-frequency representation of the received digital signal;

divides the received-signal vector into received-signal segments;

assigns each received-signal segment into a plurality of received-signal parameters; and expands each received-signal segment and plurality of received-signal parameters into an expanded received-signal vector.

17. The computing device of claim 15, wherein the module configured to transform the expanded received-signal vector into an orthogonal form further:

sets $[y_k] = [z_k] \Lambda V^t$, where $y_k$ is a $k^{th}$ acoustic vector for a corresponding received phoneme, $z_k$ is the corresponding orthogonal vector and $\Lambda$ and V are diagonal and unitary matrices, respectively.

18. The computing device of claim 15, wherein the module configured to transform the expanded stored phoneme vector into an orthogonal form uses singular-value decomposition and wherein transforming the expanded received-signal vector into an orthogonal form using singular-value decomposition further conforms the stored-phoneme vector into the hypersphere.

19. The computing device of claim 18, wherein determining a distance associated with the orthogonal form of the expanded received-signal vector and each orthogonal form of the expanded stored-phoneme vectors further comprises:

comparing a distance from the center of the hypersphere of the orthogonal form of the expanded received-signal vector with a distance from the center of the hypersphere for each orthogonal form of the expanded stored-phoneme vector.

20. The computing device of claim 19, wherein determining a distance associated with the orthogonal form of the expanded received-signal vector and each orthogonal form of the expanded stored-phoneme vectors further comprises:

determining a difference between the distance from the center of the hypersphere of the orthogonal form of the expanded received-signal vector and the distance from the center of the hypersphere for each orthogonal form of the expanded stored-phoneme vectors, wherein the expanded stored-phoneme vectors associated with m-shortest differences between the distance from the center of the hypersphere of the orthogonal form of the expanded received-signal vector and the distance from the center of the hypersphere for each orthogonal form of the expanded stored-phoneme vectors are recognized as most likely to be associated with the received phoneme.

* * * * *